(12) United States Patent
Marggraff et al.

(10) Patent No.: US 11,334,178 B1
(45) Date of Patent: May 17, 2022

(54) SYSTEMS AND METHODS FOR BIMANUAL CONTROL OF VIRTUAL OBJECTS

(71) Applicant: KINOO, Inc., Mountain View, CA (US)

(72) Inventors: Lewis James Marggraff, Lafayette, CA (US); Nelson George Publicover, Bellingham, WA (US)

(73) Assignee: KINOO, Inc., Mountain View, CA (US)

( * ) Notice: Subject to any disclaimer, the term of this patent is extended or adjusted under 35 U.S.C. 154(b) by 0 days.

(21) Appl. No.: 17/396,643

(22) Filed: Aug. 6, 2021

(51) Int. Cl.
  *G06F 3/038* (2013.01)
  *G06F 3/042* (2006.01)
  *G06F 3/0346* (2013.01)
  *H04N 5/225* (2006.01)

(52) U.S. Cl.
  CPC ............ *G06F 3/038* (2013.01); *G06F 3/0346* (2013.01); *G06F 3/0425* (2013.01); *H04N 5/2257* (2013.01); *G06F 2203/0381* (2013.01)

(58) Field of Classification Search
  CPC .............................. G06F 3/038; G06F 3/0346
  See application file for complete search history.

(56) References Cited

U.S. PATENT DOCUMENTS

| | | | |
|---|---|---|---|
| 2012/0182396 A1* | 7/2012 | Hu | G06F 3/0346 348/47 |
| 2015/0135132 A1* | 5/2015 | Josephson | G06F 3/04842 715/784 |
| 2015/0189140 A1* | 7/2015 | Sutton | H04N 5/2257 348/208.1 |
| 2019/0102919 A1* | 4/2019 | Josephson | G06F 3/04815 |
| 2019/0370545 A1* | 12/2019 | Josephson | G06T 15/06 |
| 2020/0341538 A1* | 10/2020 | Zhu | A63F 9/1208 |
| 2020/0368616 A1* | 11/2020 | Delamont | A63F 13/25 |
| 2021/0096726 A1* | 4/2021 | Faulkner | G06F 3/04883 |

* cited by examiner

*Primary Examiner* — Chun-Nan Lin
(74) *Attorney, Agent, or Firm* — William A. English; Vista IP Law Group LLP

(57) ABSTRACT

Systems and methods to enact machine-based, substantially simultaneous, two-handed interactions with one or more displayed virtual objects. Bimanual interactions may be implemented by combining an ability to specify one or more locations on a touch-sensitive display using one or more digits of a first hand with an ability to monitor a portable, handheld controller manipulated by the other hand. Alternatively or in addition, pointing by the first hand to the one or more locations on a display may be enhanced by a stylus or other pointing device. The handheld controller may be tracked within camera-acquired images by following camera-trackable controller components and/or by acquiring measurements from one or more embedded internal measurement units (IMUs). Optionally, one or more switches or sensors may be included within the handheld controller, operable by one or more digits of the second hand to enable alternative virtual object display and/or menu selections during bimanual interactions.

21 Claims, 8 Drawing Sheets

SYSTEMS AND METHODS FOR BIMANUAL CONTROL OF VIRTUAL OBJECTS

FIELD OF THE INVENTION

The present invention relates generally to systems and methods for an individual to interact with one or more virtual objects using both hands in a substantially simultaneous fashion. Systems and methods utilize techniques within the fields of computer programming, graphical display, touch-sensitive screens, image acquisition, device controllers, graphical user interfaces (GUIs), cognition, human motor control and human-machine interactions. Bimanual control of virtual objects may allow GUI designers an expanded array of human-machine interaction modalities based on natural human behaviors and motions. In most individuals, bimanual motor control and skills may be readily learned and applied throughout life. Systems and methods may provide users with intuitive machine interfaces to rapidly and/or accurately interact with virtual objects.

BACKGROUND

From cognitive and motor control perspectives, many (if not most) learned activities involved in everyday life are bimanual. Typing, eating with utensils, playing most musical instruments and tying shoe laces are all examples of learned activities involving bimanual manipulations. Indeed, it is commonly accepted that one evolutionary aspect of bipedalism involves liberation of the upper extremities so that humans can take advantage of bimanual manipulation of the environment.

On the other hand, not all bimanual manipulations are readily performed, particularly when spatial bilateral coupling (especially in-phase or out-of-phase) and/or repetitive motions occur. Classic examples demonstrating such cognitive interference in motor pathways that control each extremity include 1) simultaneously trying to rub one's tummy with one hand while patting one's head with the other, or 2) drawing a circle with one hand while attempting to draw a straight line with the other. However, a modest amount of learning (even by trial-and-error) can generally overcome most limitations of spatial motor control during bimanual manipulation.

At a temporal level, there is a natural cognitive tendency (i.e., absent brain abnormalities such as hemiplegic cerebral palsy) to both begin and end activities by both hands (especially those involving reaching) at the approximately same time. During most bimanual human-machine interactions this may be a convenient relation to help identify the beginnings and/or ends of interactions. GUIs designed to monitor bimanual interactions that, for example, have different temporal endpoints for each hand may feel awkward and difficult to perform. Thus, although learning may be a component of enacting many bimanual controls, GUIs designed around natural bimanual tendencies and movements may allow intuitive interactions with virtual objects.

The systems and methods disclosed herein make use of recent advances in the fields of touch-screen displays, mobile devices, camera-based object tracking, inertial measurement units (sometimes also referred to as inertial motion units), and portable device controllers. Bimanual control may be implemented by combining an ability to specify one or more locations on a touch-sensitive display using one hand, with machine-based abilities to monitor a handheld controller simultaneously manipulated by the other hand using camera-based tracking of controller location and/or one or more embedded internal measurement units (IMUs).

The display components of touch-screen displays are typically implemented as: 1) a two-dimensional array of light sources (most frequently light-emitting diodes, LEDs), or 2) two plates of polarized glass that sandwich liquid crystal material (i.e. forming a liquid crystal display, LCD) that responds to an electric current by allowing different wavelengths of light to pass. Within both implementations, such two-dimensional visual displays are composed of (typically millions of) tiny, addressable dots or pixels.

Touch-screen displays use a variety of techniques to sense positions on a screen touched by one or more digits of a hand, knuckles, styluses, or other body parts or pointing devices. Most portable touch-screens operate by sensing: 1) capacitance, 2) resistance, or 3) perturbations in surface (acoustic or ultrasound) waves when touched. The process of touching a screen locally discharges capacitance, completes a resistive circuit pathway or absorbs a surface acoustic wave, allowing the position of one or more digits (or other pointing objects) to be determined.

Although somewhat dependent on the size of a pointer (e.g., finger) and screen position (i.e., with increased accuracy generally occurring near the center of most screens), by computing geometric point references such as the centroid of a touched area, the two-dimensional accuracy of touch-screen displays is generally sufficient to, for example, allow typing using typical keyboard layouts. In addition, the location being pointed to on a touch-sensitive display may generally be computed in absolute terms (e.g., measured in pixels with known spacing, or units of distance) relative to objects displayed on the screen and/or references locations of the display (e.g., display edges, screen center).

Video tracking, involving the use of one or more cameras to continuously locate (and optionally identify) moving objects over time, has benefited from recent developments in machine vision techniques including the use of kernel-based localization and neural networks (especially convolution neural networks, CNNs). These approaches have facilitated a great expansion in the use of video tracking for applications ranging from the tracking of vehicle movements throughout expansive metropolitan areas to the tracking of minute movements of an individual's pupils.

Similar to determining touch screen position as just described, the accuracy of determining the relative location of an object within a visual field may be increased by computing geometric point references such as an object's centroid, or one or more sharp edges or high-contrast regions within its shape. Optimally, objects being tracked are distinctive from other objects and/or backgrounds within a camera's field-of-view. Additionally, when use-environments are not controlled during tracking, hardware- and software-based techniques may be applied to combat image interference produced by a range of conditions including low light, bright sources of light, and high-contrast or complex-patterned backgrounds.

Inertial measurement units (IMUs) may incorporate any or all combinations of: 1) linear accelerometers measuring forces due to movement in up to three axes or dimensions, 2) gyroscope-based sensing of rotational rates or velocities in up to three axes, 3) magnetometers measuring magnetic field (i.e., magnetic dipole moment) including fields generated by the earth, and/or 4) the gravitational pull of the earth (including gravitational orientation) by measuring forces on an internal mass. The accuracy of IMUs varies widely, depending on size, operating range, compensating hardware that may be used for correction of measurements (affecting cost), environmental factors including thermal gradients, the availability of individual device calibrations, and (integration) time required to perform measurements.

Systems and methods that facilitate intuitive bimanual interactions between a user and electronic devices would be useful.

SUMMARY

In view of the foregoing, systems and methods are provided herein for bimanual control of the display attributes of one or more virtual objects. As described herein, by substantially simultaneously combining: 1) the ease and spatial accuracy of one or more screen touches relative to virtual objects displayed on a touch-sensitive screen enacted by one hand with 2) camera- and/or IMU-based tracking of free-range movements of the other hand gripping a handheld controller, intuitive and/or rapid control of one or more virtual objects may be implemented.

In one example, substantially simultaneous two-handed control may be implemented by combining an ability to specify one or more locations on a touch-sensitive display using one or more digits of one hand (or other pointing mechanism such as a stylus controlled by the hand) with an ability to monitor a portable, handheld controller manipulated by the opposing hand. The handheld controller may be tracked by camera-based following of the controller (or, more specifically, camera-trackable controller components) and/or one or more embedded internal measurement units (IMUs). Optionally, one or more switches or sensors may also be included within the handheld controller, operable by one or more digits of the opposing hand.

Examples of display attributes include a virtual object's size, shape, display location, one or more colors, one or more textures, component line thicknesses, component line characteristics (e.g., solid line, intermittent line, rounded edges), transparency, orientation relative to display edges or other virtual objects, stretch in one or more directions, three-dimensional viewing perspective, rotation, translation, and/or movement characteristics. Virtual object movement characteristics may include one or more ranges of motion, velocity of movement (e.g., scale factors relating controller movements to virtual object movements appearing on a display), implementation of repetitive (e.g., rotational, translational) movements, movements of object components, and so on. Display attributes may also include an initial or updated selection of the displayed virtual object itself (e.g., from a menu of different objects), associated text labelling, flashing and/or other means of attracting attention, the production of one or more sounds associated with the object, and so on.

Camera-based tracking of a handheld controller may be implemented using a tablet, smart phone, laptop, smart television or display, augmented or virtual reality wearable headset, or other mobile electronic device. Such devices often include one or more embedded cameras along with one or more processors and a touch-sensitive display (or "touch-able" virtual display in the case of a virtual reality headset). Bimanual control may typically be implemented by a system that includes such a device coupled with an operatively coupled, trackable handheld controller with an incorporated IMU. Alternatively or in addition, camera-based tracking of the handheld controller may be implemented using one or more cameras operatively coupled (e.g., via cable or Wi-Fi) to the one or more processors that generate graphics (i.e., not necessarily incorporated within the touch-sensitive display device). Alternatively, the handheld controller may (minimally) be a passive (i.e., non-electronic) device, simply composed of camera-trackable device components (e.g., made from polymer or plastic) and/or controls enacted by camera-trackable movements of hand digits.

The use of one or more cameras provides an accurate and rapid (i.e., dependent on camera frame rate and/or processing) method to track relative positions of a handheld controller. However, under some conditions, it may not be possible to continuously follow locations of the handheld controller using such computer vision techniques. This may arise, for example, if the controller is outside the field-of-view of the one or more cameras, concealed by one or more objects between camera(s) and the controller, or obscured by one or more bright lights in the region. During these times, it may be possible to continue estimating movements of the handheld controller using one or more embedded (i.e., affixed anywhere within or on the controller) IMUs. Although integration (i.e., over time) of IMU-based velocity and/or acceleration measures may produce estimates of controller locations, IMUs generally lack abilities to produce precise measures of absolute position, especially over prolonged periods absent absolute measures (e.g., absent tracking using a camera). During times when video-based tracking is not available or viable, IMU-based measurements may help estimate handheld controller locations and/or movements.

Selections of which hand to use to control display attributes via the touch-sensitive display versus the handheld controller may generally be a matter of personal preference, and include considering the handedness of the user. Additionally, hand selection may be task-dependent. For example, while performing the virtual activities of hammering a nail or turning a screw with a screwdriver, e.g., as illustrated in FIGS. 5 and 6 respectively, identifying the position of the nail or screw (or to hold or stabilized the nail or screw) may be specified by a non-dominant hand while the act of hammering or turning the screwdriver may generally be performed most comfortably via the handheld controller using a dominant hand.

On the other hand, specifying a display location and/or rotational orientation for a newly selected virtual object (e.g., an image of a person, dwelling or automobile) when, for example, composing or drawing a scene may often most comfortably be performed using fingers (or stylus) of a dominant hand while attributes such as size and/or colors of objects may preferentially be controlled via the handheld controller using a non-dominant hand.

As described in greater detail within the Detailed Description below, the term "substantially simultaneously" is being used to indicate a general temporal alignment of the actions by both hands (including digits and/or control of a stylus) of an individual; however, such actions may not occur or be determined at a precisely synchronous time due, for example, to mental focus on the motor control of one hand before focusing on movements by the other, times required for physical movement of hands (and digits), times required for perception of changes within displayed virtual objects, transmission and/or processing delays, and so on. Also, as noted below, the singular forms "a," "an," and "the" include plural referents unless the context clearly dictates otherwise.

In accordance with an example, a method is provided for a human to bimanually interact with one or more virtual objects that includes: providing in proximity to the human, operatively coupled to one or more processors, a touch-sensitive display, a camera and a handheld controller wherein the handheld controller is operated by a first hand of the human and includes one or more camera-trackable components; acquiring, by the camera, a first image of the one or more camera-trackable components; determining within the first image, by the one or more processors, a first controller location of the one or more camera-trackable components; assigning, by the one or more processors, one or more first display attributes of the one or more virtual objects based on the first controller location; determining, by the one or more processors, one or more first digit locations on the touch-sensitive display contacted by one or more digits of a second hand of the human; assigning, by the one or more processors, one or more second display attributes of the one or more virtual objects based on the one or more first digit locations; and displaying, by the one or more processors on the touch-sensitive display, using the one or more first display attributes and the one or more second display attributes, the one or more virtual objects.

In accordance with another example, a method is provided for a human to bimanually interact with one or more virtual objects that includes: providing in proximity to the human, operatively coupled to one or more processors, a touch-sensitive display and a handheld controller wherein the handheld controller is operated by a first hand of the human and includes one or more inertial measurement units; acquiring, by the one or more processors from the one or more inertial measurement units, first acceleration data; determining from the first acceleration data, by the one or more processors, one or both of a first acceleration magnitude and a first acceleration direction; assigning, by the one or more processors, one or more first display attributes of the one or more virtual objects based on one or both of the first acceleration magnitude and the first acceleration direction; determining, by the one or more processors, one or more first digit locations on the touch-sensitive display contacted by one or more digits of a second hand of the human; assigning, by the one or more processors, one or more second display attributes of the one or more virtual objects based on the one or more first digit locations; and displaying, by the one or more processors on the touch-sensitive display, using the one or more first display attributes and the one or more second display attributes, the one or more virtual objects.

In accordance with yet another example, a system is provided for a human to bimanually interact with one or more virtual objects that includes a touch-sensitive display operatively coupled to one or more processors, a camera operatively coupled to the one or more processors, and a handheld controller operatively coupled to the one or more processors, wherein the handheld controller is configured to be operated by a first hand of the human and includes one or more camera-trackable components; and wherein the one or more processors are configured to: acquire by the camera a first image of the one or more camera-trackable components; determine within the first image, a first controller location of the one or more camera-trackable components; assign one or more first display attributes of the one or more virtual objects based on the first controller location; determine one or more first digit locations on the touch-sensitive display contacted by one or more digits of a second hand of the human; assign one or more second display attributes of the one or more virtual objects based on the one or more first digit locations; and display on the touch-sensitive display, using the one or more first display attributes and the one or more second display attributes, the one or more virtual objects.

Other aspects and features including the need for and use of the present invention will become apparent from consideration of the following description taken in conjunction with the accompanying drawings.

BRIEF DESCRIPTION OF THE DRAWINGS

A more complete understanding of the present invention may be derived by referring to the Detailed Description when considered in connection with the following illustrative figures. In the figures, like-reference numbers refer to like-elements or acts throughout the figures. Presented examples are illustrated in the accompanying drawings, in which.

DETAILED DESCRIPTION

Figure 1A:
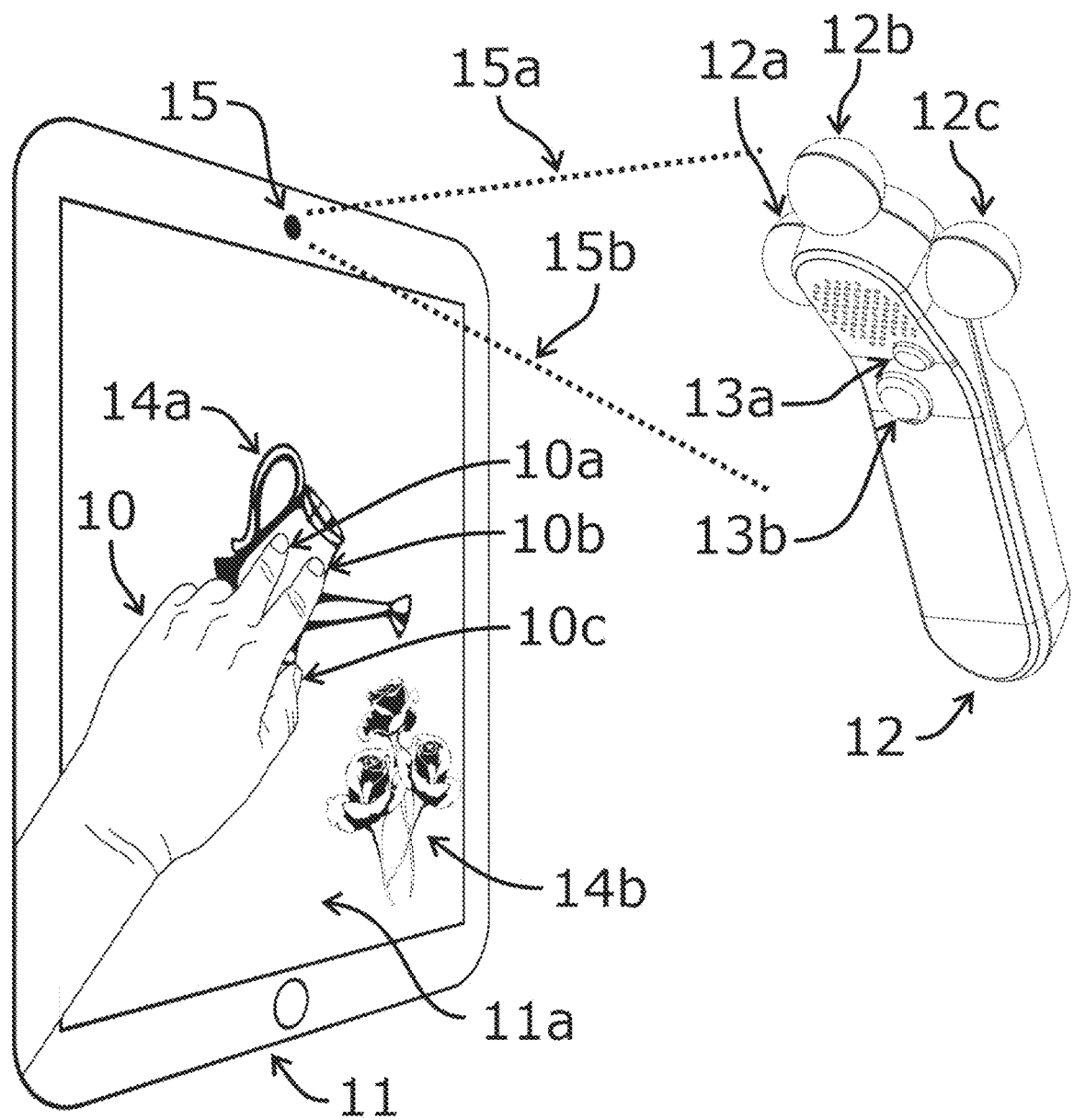
FIG. 1A shows an example of bimanual control of a virtual watering can in which three digits of one hand control the can's location, size and rotational orientation (i.e., pitch) in the plane of the touch-sensitive screen while a handheld controller manipulated by the other hand controls additional aspects of the user's viewing perspective (e.g., the displayed roll and yaw of the watering can and other virtual objects on the screen).

Before the examples are described, it is to be understood that the invention is not limited to particular examples described herein, as such may, of course, vary. It is also to be understood that the terminology used herein is for the purpose of describing particular examples only, and is not intended to be limiting, since the scope of the present invention will be limited only by the appended claims.

Unless defined otherwise, all technical and scientific terms used herein have the same meaning as commonly understood by one of ordinary skill in the art. It must be noted that as used herein and in the appended claims, the singular forms "a," "an," and "the" include plural referents unless the context clearly dictates otherwise. Thus, for example, reference to "a compound" includes a plurality of such compounds and reference to "the polymer" includes reference to one or more polymers and equivalents thereof known to those skilled in the art, and so forth.

Also within descriptions herein, the term "substantially simultaneously" is used to describe the performing of actions including interactions involving distinct movements by each hand of an individual and subsequent machine-based processing. "Substantially simultaneously" signifies that, although an individual as well as systems and methods may strive to perform such actions simultaneously, resultant interactions, particularly involving movements of both hands (including digits or other pointing mechanisms), may not occur precisely simultaneously. Such temporal differences may arise as a result of a number of factors including reaching out toward the touch-sensitive display, extending one or more digits toward the display, a temporary mental focus on movements of one hand, time required for movement of the handheld controller, integration times required to acquire signals from the touch-sensitive display and/or IMU(s), camera image capture times, any transmission of resultant data among devices, processing times by one or more operatively coupled processors, and so on.

A threshold for distinguishing between "substantially simultaneous" bimanual control versus two separate controlling actions by each hand may be based on user preference. A temporal threshold to distinguish the two situations may be in a range up to 10 (ten) seconds. The threshold may be preassigned by GUI designers where, for example, (if known) the user's age, experience using interactive devices, and/or physical abilities may be taken into account. As an example, the temporal threshold may be set to be longer for the very young or the elderly. Alternatively or in addition, temporal thresholds may be adjusted dynamically during use by an individual, particularly if it is determined that an excessive number of corrective control actions are taken by an individual following conditions where "substantially simultaneous" bimanual control may typically be performed.

Bimanual control of one or more virtual objects may be implemented by combining an ability to specify locations on a touch-sensitive display using one or more digits (or employing one or more pointing instruments, such as a stylus) of one hand with substantially simultaneously determining the location, movement and/or orientation of a handheld controller manipulated by the opposing hand. The handheld controller may be tracked by camera-based following of one or more camera-trackable controller components and/or one or more embedded internal measurement units (IMUs). Optionally, one or more switch and/or sensor based controls may be included within the handheld controller, operable by one or more digits (or other structures) of the opposing hand.

Alternatively, the handheld controller may (minimally) be a passive (i.e., non-electronic) device, simply composed of camera-trackable components. Controllers may, for example, be constructed from rubber, polymer, wood and/or plastic, optionally with distinctly colored and/or shaped features. A controller may even include a printed or projected image on a surface (e.g., paper, cardboard). Such minimal bimanual control may, for example, be suitable for brief interactions when an electronic device is not available, and/or within controlled environments where it anticipated that camera-based tracking is routinely reliable (i.e., environments in which IMU-based tracking is rarely, if ever, needed).

Within additional examples, minimal or "dumb" controllers may (optionally) be constructed to have roughly the same colors and shapes as a "smart" (i.e., electronic) controller. Dumb controllers may be particularly suitable for use by very young children where product safety may be of paramount concern. Dumb controllers may provide a subset of control functions (e.g., those implemented exclusively via camera tracking) but be constructed in a manner that avoids breakage or harm (e.g., even when chewed upon). Translational and/or rotational movements of a dumb controller may be tracked by the one or more cameras. Positions of digits or other regions of a hand over specific aspects of the dumb controller (e.g., protrusions that looks like a pushbutton, colored dots) may additionally be used to signal user choices in much the same way as real buttons.

Additional aspects may be incorporated within designs of the handheld controller to include controller elements that make camera-based tracking: 1) reliable, 2) informational, 3) precise, 4) unobtrusive and/or 5) rapid. Reliability, including the ability to distinguish the controller from elements within a typical user environment (i.e., under a variety of background and/or lighting conditions), may be enhanced by including one or more unique visual elements of the controller that are not normally observed within user environments. The one or more camera-trackable components may include one or more incorporated light emitting diodes, one or more light-reflective surfaces, one or more colored surfaces, one or more translucent materials, one or more light-diffusing materials, a predetermined component shape, a predetermined light-reflective pattern, a predetermined colored pattern, a predetermined translucent material pattern, and/or a predetermined light-diffusing pattern.

Such distinguishing elements may also be sized and/or spaced at known (i.e., to the one or more processors) distances or dimensions. By comparing size/spacing within camera images of elements with known dimensions/spacing (and knowing point spread functions of the optical arrangement of the one or more cameras), estimates of distance between the one or more cameras and the handheld controller may be obtained. Alternatively, or in addition, tracking by two or more cameras (i.e., from different viewing angles) may allow distances (from cameras and/or other objects in the environment) to be "triangulated". Additionally, by making different elements of the camera-trackable components of the controller distinguishable (e.g., using different colors, reflective surfaces and/or shapes), rotational orientation (i.e., in one or more dimensions) of the controller (e.g., relative to the portion of the controller held by a hand, see FIG. 1B) may be discerned.

Such sizing and or spacing may also be optimized to coincide with camera resolution(s) (i.e., covering a sufficient number of pixels within camera images) to maximize tracking resolution over the range of viewing distances (i.e., from camera to handheld controller) anticipated during normal use. By utilizing sufficient camera resolution, camera-based tracking elements of the handheld controller may also allow sizing and/or separations of the camera-trackable elements of the handheld controller to be unobtrusive (e.g., in weight, separation and/or size) during use (see FIG. 1B). In other words, by having camera resolution be sufficient to allow images of camera-trackable controller elements occupy an adequate number of light-sensing pixels (i.e., contributing to the precision of calculations) to make accurate positional calculations during tracking at normal operating distances, the camera-trackable elements may be made small enough so as to not interfere with manually manipulating the controller.

As illustrated in flowcharts within FIGS. 2, 3 and 4 and described further below, bimanual control may be implemented by repeatedly (i.e., using a loop structure) querying whether a touch-sensitive screen has been touched, assessing handheld controller movements via image processing and/or IMU measurements and, optionally, sensing the states of any controller switches or other sensors. Although implementations are not restricted to such serial loop structures, an overall range for bimanual control rates may be assessed by individually considering each data stream:

1) Frequently, rates for sampling a touch screen are in the same range as display rates, often 30 (thirty) to 120 (one hundred twenty) Hertz.

2) IMU-based measurements generally include a trade-off between noise and sample rate, but many IMUs may operate in ranges up to 400 (four hundred) samples per second while keeping costs (e.g., for compensation circuitry) and/or power consumption modest.

3) When tracked by one or more cameras and as long as sufficient computing resources are available, the temporal resolution of control by imaging the handheld controller generally aligns with the frame rate of the camera(s).

In further examples, modern-day cameras allow frame rates to be controlled dynamically. Thus, in situations when rapid responses are not required and/or anticipated, frame rates may be kept relatively slow (e.g., one to fifteen frames per second) in order to conserve computing resources and/or power consumption. In situations when rapid responses are advantageous (e.g., detailed drawing, accurately discerning rapid movements such as throwing a virtual ball) frame rates may be increased (e.g., thirty to two hundred frames per second and beyond) in order to accurately record small movements and/or large velocities of tracked objects. Along similar lines, IMU sampling rates may be increased (often at the cost of increased noise) during times when measurements of smaller movements and/or larger velocities are anticipated.

Using one or more digits to point at locations on a touch-sensitive display screen offers an ability to specify locations in absolute terms (i.e., measured in terms of absolute distance and/or pixels with known spacing) relative to displayed objects or other references such as edges of the display, buttons on the display, and so on. In contrast, measured (i.e., by a camera and/or IMU) movements of the handheld controller are generally not aligned with absolute dimensions on a display screen or any internal representation of distances within a collection of one or more virtual objects.

Within many situations during human-machine interactions, precise indications of absolute position and/or location relative to one or more virtual objects on a display may not be required. As a simple example, upon viewing and selection of a fork in a virtual road, an indication of whether to turn left or right (i.e., a simple binary choice) may be indicated with limited spatial precision. In this case, any indicated location or motion in a direction to the left or right (e.g., absent any requirement to point directly at the right or left pathway) would be sufficient to indicate a user's choice.

In further examples, the use of locations and/or motions by a controller that take into account interactive context leads to a notion of "interpretive control". Interpretive control may reduce the accuracy, sample rates, and/or number of degrees of freedom required of controlling devices by making assumptions about user intent based on interactive context. Examples of contextual interpretations that may lead to a relaxing of controller precision include specifying a choice from a limited number of viable selections, using one or more previous and/or frequent selections to arrange choices within spatial patterns that make similar selections easy to pick, linear or other forms of extrapolation of shapes and/or motions of virtual objects, motions or other characteristics of virtual objects constrained by known laws of physics (e.g., deformations, flow, reactions to gravitational pull), and so on.

Thus, "interpretive control" may relax constraints on location(s) and/or motion(s) of virtual objects specified by one or more controllers based on context. For example, if a selection is being made among a number of virtual objects, then the spatial resolution to make a selection may be reduced to the point of simply distinguishing one selection from another (e.g., only being in the vicinity of a virtual object, not having to directly specify a location directly occupied by a particular virtual object). Along similar lines, if an activity involves movement in a limited number of dimensions (e.g., movement in one linear or angular direction) then controlling motions in other directions may be ignored. If an activity involves movement over a confined range (in one or more directions), then controller indications of movements beyond that range may be ignored. In further examples, if a controller location and/or movement is sufficient to specify a particular virtual activity, then the entire activity may be completed (i.e., by the one or more processors), regardless of additional inputs by the controller (until the action or activity is completed). Interpretive control may be particularly useful within interactions involving the very young, the elderly, or those with reduced motor and/or cognitive functions.

Although interpretive control may be applied using any interactive device, interpretive control using the handheld controller may be particularly beneficial during bimanual interactions. As just described, lacking an ability by the handheld controller to directly specify absolute positions on a display (i.e., without some form of visual feedback) may be limiting in some applications. However, using interpretive control and/or context to relax constraints (e.g., not requiring absolute position) expands the utility of handheld controllers.

Figure 5:
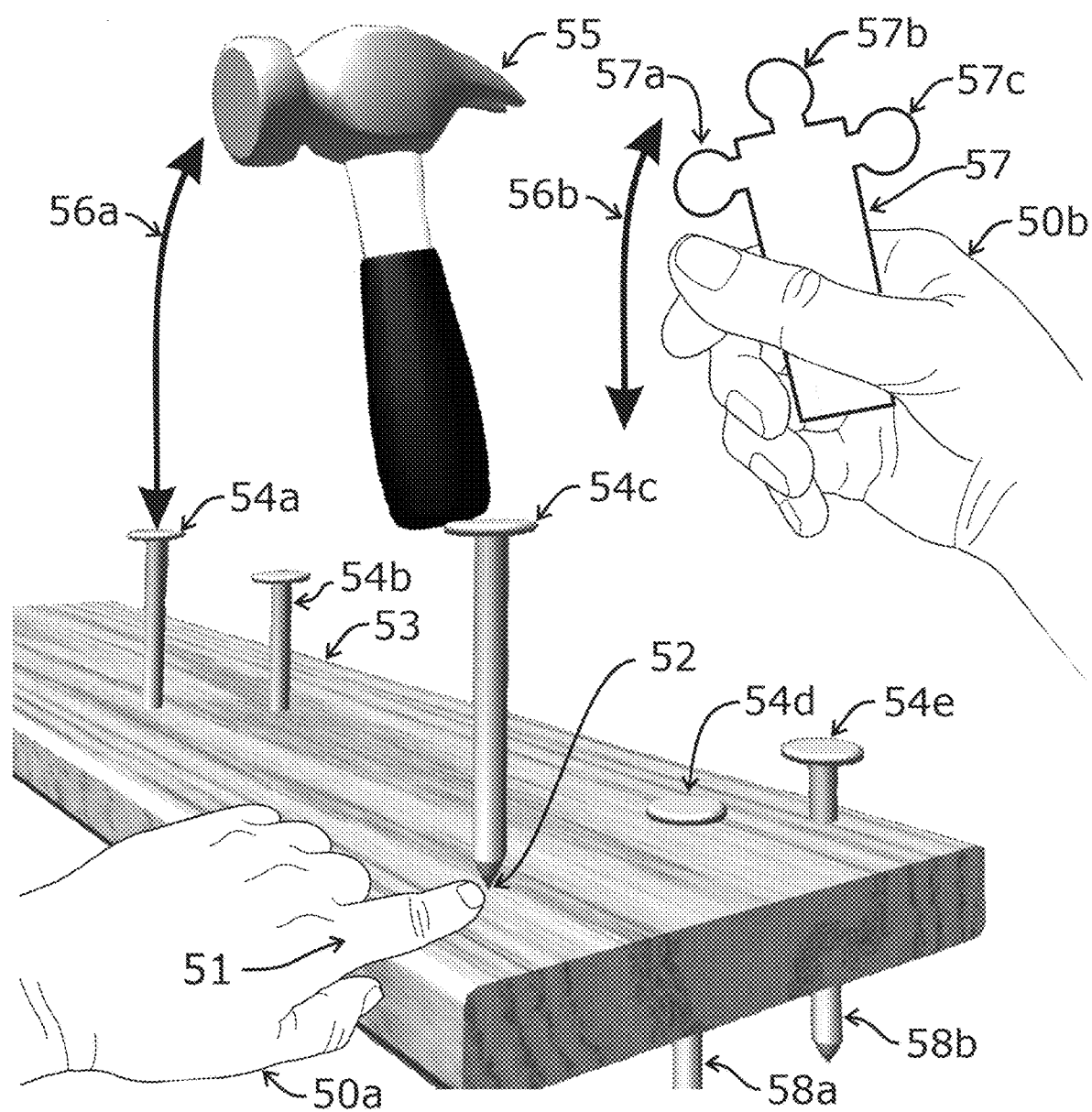
FIG. 5 demonstrates a scenario involving the hammering of virtual nails in which one hand positions each virtual nail to be hammered on a touch-sensitive display while, substantially simultaneously, the other hand hammers the nails using a handheld controller to guide a virtual hammer.

As examples, the act of hammering a nail illustrated in FIG. 5 may interpret any generally up-and-down motion by the handheld controller (or up-and-down swipes on the touch-sensitive display) as generating virtual hammering. Once a virtual nail has been specified (e.g., using the touch-sensitive screen), exact positioning of the hammer above a nail (e.g., otherwise causing a nail to be "missed") may be excluded as a requirement during interpretive control. Similarly, back-and-forth or rotational motions by the controller (or sideways swipes on the touch-sensitive display) are not considered within "hammering" actions. Interpretive control of the process of hammering as illustrated in FIG. 5 may be particularly helpful to a young child who might not yet possess motor controls for precise movements or understand all of the nuances involved with the process of hammering a nail.

Figure 6:
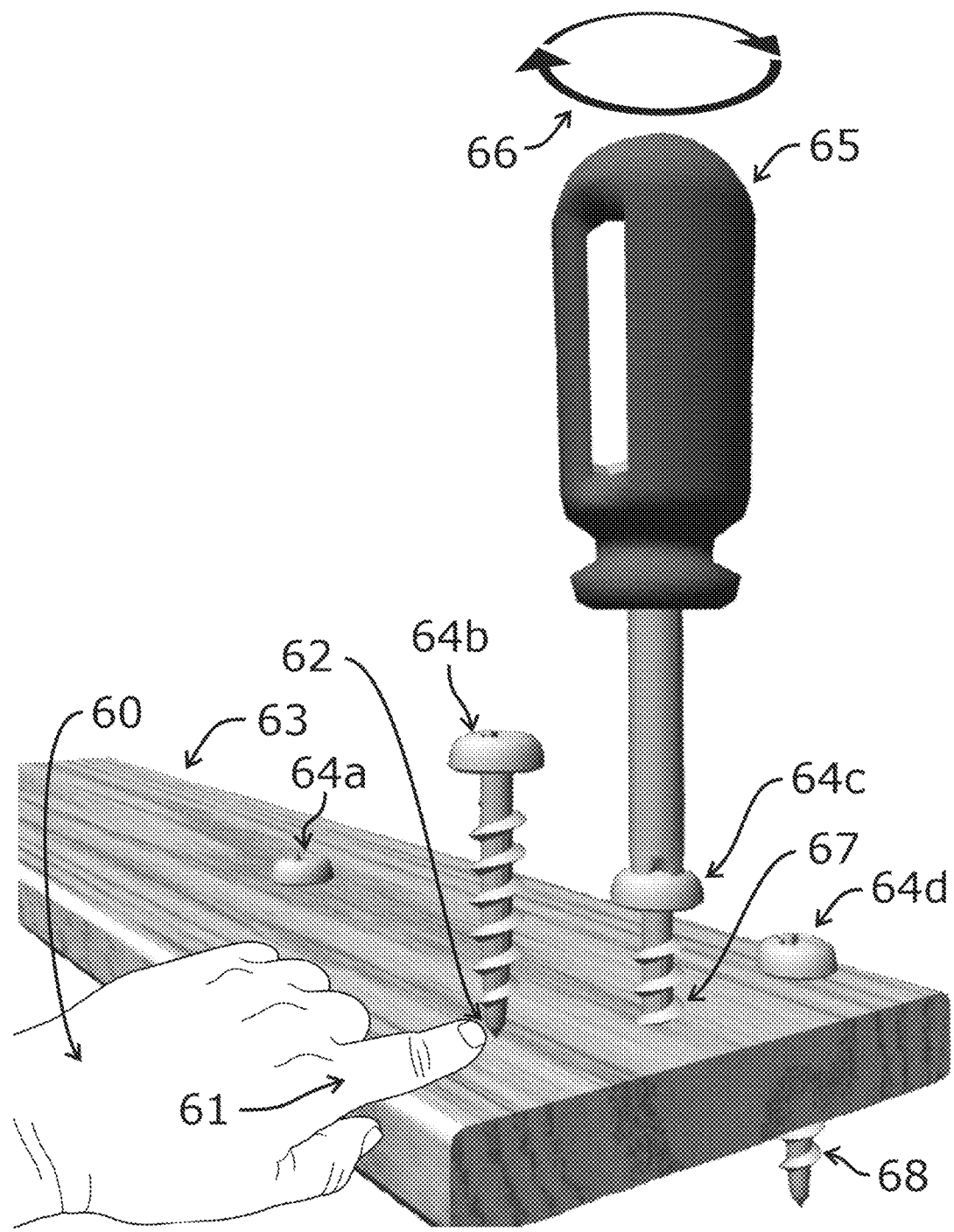
FIG. 6 shows a scene involving the use of virtual screws to fasten virtual boards in which one hand controls locations of the screws on a touch-sensitive display while, substantially simultaneously, the other hand manipulates a handheld controller to direct the rotational operation of a virtual screwdriver.
Figure 7:
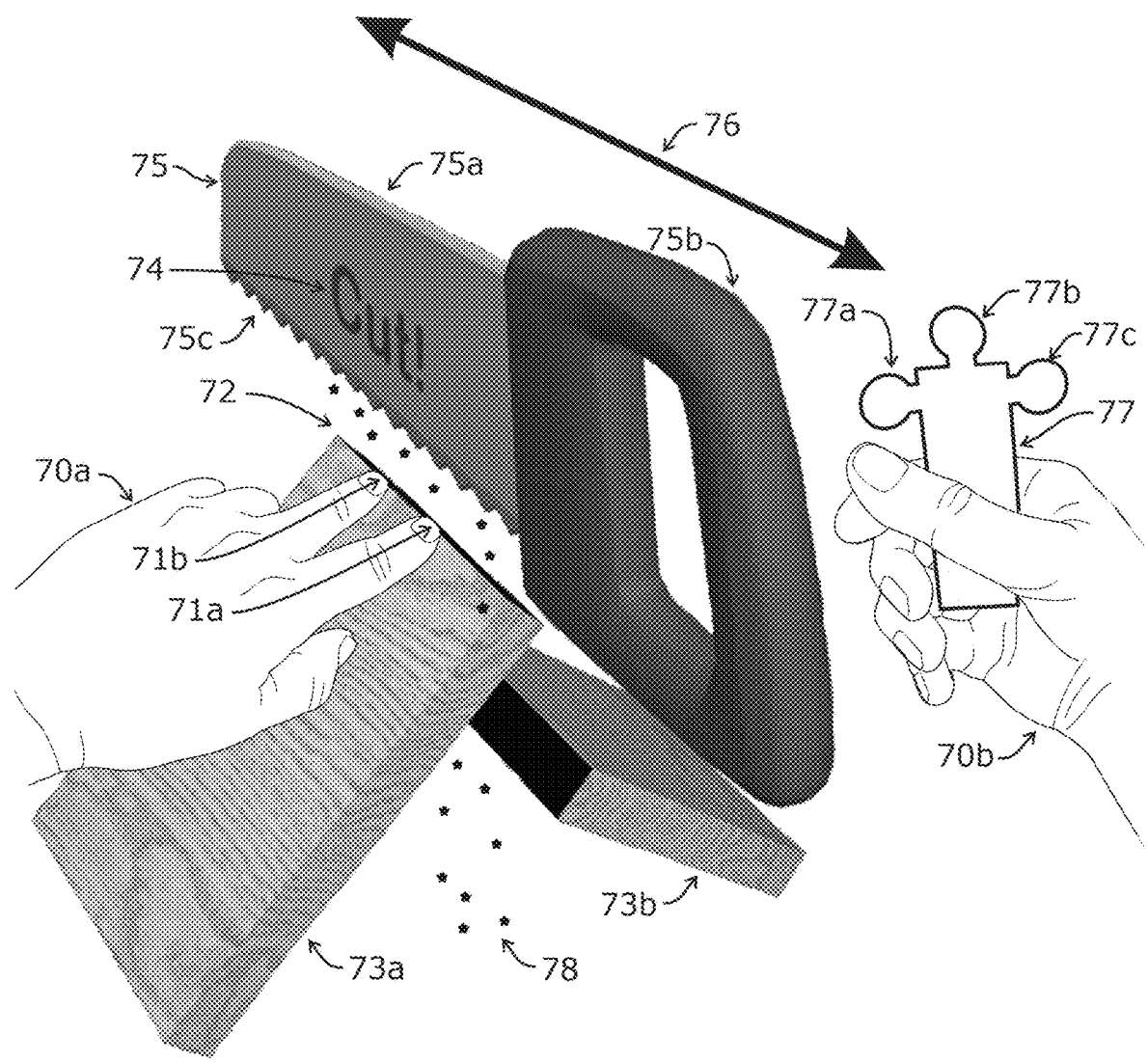
FIG. 7 shows a scenario involving the sawing of virtual boards where multiple digits of one hand contacting a touch-sensitive display control the location and angle of cutting while the other hand substantially simultaneously pushes a saw back-and-forth to cut the board using a handheld controller.

Along similar lines as illustrated in FIGS. 6 and 7, any rotational motion by the controller may be interpreted as turning a screwdriver (FIG. 6), and any back-and-forth movement of the controller may be translated into sawing actions (FIG. 7). Interpretive control removes commonly applied one-to-one mapping (e.g., of a typical cursor) relating controller movements with absolute position on a display. Rather, handheld controller movements in particular may be interpreted for intent, based on context, and applied to virtual activities.

Within additional examples, attributes associated with the display location of a virtual object may contextually take into account a virtual object's size, shape, rotational orientation, primary features, and/or even one or more nearby virtual objects. If a virtual object reference (e.g., center, edge, directional pointing feature) or identifiable subcomponent (e.g., face, arm, handle, button, lever) is in the vicinity of a location indicated via bimanual interaction, display of the virtual object may be offset, sized or oriented to take into account key object features. Locations may be "nudged" (i.e., over small distances) to align with a virtual object's and/or adjacent objects' features or references. In other words, mapping of screen touch and/or handheld controller locations or motions may not be applied strictly in a one-to-one fashion when determining an object's display location, rotational orientation or other attributes.

More specifically, by manipulating a touch-sensitive display screen and/or handheld controller, a virtual object display location may be determined by one of:

1) aligning one or more touch locations with one of a center of the virtual object, a predetermined edge of the virtual object, a predetermined reference location of the virtual object, the predetermined reference location of the virtual object offset by a predetermined distance and a predetermined direction, and a rotational center of the virtual object;

2) identifying a nearby displayed object located closest to the one or more touch locations, identifying a predetermined nearby reference location of the nearby displayed object, and displaying the virtual object at the predetermined nearby reference location;

3) aligning controller location with one of a center of the virtual object, a predetermined edge of the virtual object, a predetermined reference location of the virtual object, the predetermined reference location of the virtual object offset by a predetermined distance and a predetermined direction, and a rotational center of the virtual object; and 4) identifying a nearby displayed object located closest to the controller location, identifying a predetermined nearby reference location of the nearby displayed object, and displaying the virtual object at the predetermined nearby reference location.

Along similar lines, selections made using bimanual control (particularly using the handheld controller) may also be subject to interpretive control. Controller-specified locations and/or motions during selections may consider only selections that match interaction context. For example, when asked to select a favorite pet, bimanual selections may be restricted to regions of a display and/or motions that represent animals. Based on context within a displayed scene, a non-animal virtual object may be ignored and a nearby animal selected during the interaction.

Optionally, the handheld controller may include one or more pushbuttons or other sensors to determine the position and/or force applied by one or more digits of the hand manipulating the controller. Such "digital" (i.e., signalling generated by digits of the hand) sensing mechanisms may include galvanic contact, capacitive (e.g., discharge caused by a digit), reflective light (i.e., reflecting off the skin of a digit), force (e.g., force-sensing resistors), and so on. Selections determined from the position, movements (i.e., relative to the controller itself) and/or forces applied by the digits (or other structures) of the hand may complement control enacted by overall tracked movements of the controller.

As an example of complementary "digital" control, while movements of a controller direct the viewing perspective (e.g., direction, distance) of a displayed object, the pressing of a pushbutton may enact an ability to select (e.g., from a menu) different virtual objects. As a more specific example: 1) the size and location on a display of an object such as an automobile may be specified using one or more digits of one hand contacting the touch-sensitive display, 2) the viewing perspective of the display including observational direction and/or distance may be controlled by the position in space (i.e., relative to the camera) of the handheld controller (i.e., manipulated by the opposing hand), and 3) one or more pushbuttons on the handheld controller may either switch among a pre-selected sequence of models of automobiles and/or enable scrollable menus to select from an array of different manufacturers and/or models.

Other examples of "digital" indications coupled to handheld controller movements within bimanual control settings include selection of font and/or sizing when positioning text, selecting a pre-specified/alternative set of object attributes (e.g., line thickness or fill pattern), selecting alternative object colors, enabling a display of object attribute menus, temporarily increasing or decreasing the magnification applied while displaying an object, "undoing" a previous selection and/or attribute, repeating the application of one or more attributes, copying a selected virtual object, erasing a virtual object, and so on.

Additional examples of bimanual interactions involve controlling a viewing perspective (e.g., viewing location and direction) of an individual within an environment of virtual objects. Such virtual objects may include interactive tools, rooms, dwellings, landscape, avatars and/or even streaming video representations of other interactive users (e.g., full body, head, or head-and-shoulder images) superimposed within a "virtual world". A user may specify a location from which to view the virtual world using a touch-sensitive display (i.e., by pointing, using one hand). Substantially simultaneously, the user may control aspects of viewing perspective (i.e., in which direction to turn and look) using the handheld controller. One or more display devices may project a viewing perspective as if within the virtual world or room (e.g., finding and looking toward selected objects and/or other users). This form of bimanual control may generate an intuitive combination of controls, taking advantage of positional accuracy using a touch-sensitive display and rotational accuracy when turning the handheld controller to determine viewing direction.

As described in greater detail in the Summary above, selection of which hand to interact using the touch-sensitive display versus manipulation of the handheld controller by the opposing hand may be based on 1) personal preferences and/or 2) particular applications. Generally, interactions that involve specifying specific locations (particularly relative to displayed elements) are amenable to pointing on the touch-sensitive display and dynamic interactions (e.g., signifying actions, activities or movements) may be implemented intuitively using the handheld controller. However, illustrating the converse, swiping motions may be recorded on touch-sensitive displays and lack of movement of the controller for a predefined period may be used as a signalling indication to perform one or more virtual actions. Thus, human-machine interactions may optimally be set up to use any combination of left and right (dominant and non-dominant) hands contacting the touch-sensitive display and manipulating the handheld controller.

Within additional examples, although not "handheld" in a strict sense, controllers may be affixed and/or manipulated by other parts of the human body. A controller may, for example, be affixed to an arm, leg, foot, or head. Such positioning may be used to address accessibility issues for individuals with restricted upper limb and/or hand movement, individuals absent a hand, and/or during situations where a hand may be required for other activities. Controller movements (e.g., camera-trackable controller components) may be tracked based on motions of the controller generated by other body parts. Even pushbutton switches may be activated based on forces produced by other body parts and/or by pushing the portion of the controller containing the one or more switches against a static object (e.g., rod or other pointed mechanism of an appropriate size to operate pushbuttons).

FIG. 1A illustrates an overall view of elements of bimanual interactions, demonstrating the use of a virtual watering can 14a to water a bouquet of virtual roses 14b. In this exemplary configuration, the touch-sensitive display 11a and camera 15 used to track handheld controller movements (along with one or more processors, not shown) are incorporated within a single, portable, tablet-style electronic device 11. During interactions, three digits 10a (i.e., middle finger), 10b (i.e., index finger), 10c (i.e., thumb) of a left hand 10 control the can's location, size and rotational orientation (i.e., pitch relative to other displayed objects) in the plane of the touch-sensitive display 11a while a handheld controller 12 substantially simultaneously manipulated by the opposing hand (not shown) controls aspects of viewing perspective (e.g., the magnification, roll and/or yaw of all displayed objects).

In additional examples, tracking of one or more camera-trackable components 12a, 12b, 12c of the handheld controller 12 may occur when the controller 12 is within the field-of-view (indicated by dashed lines 15a, 15b) of the camera 15. In this case, the camera-trackable components of the handheld controller 12 include three spherical structures 12a, 12b, 12c that may include internal, illuminating light sources (e.g., LEDs, not shown). Optionally, each element of the camera trackable components may include distinct visual characteristics (e.g., unique orienting patterns, differing reflecting and/or illuminating colors, distinct shapes) to help track (e.g., distinguish tracking elements from each other and from background) and determine orientation of the handheld controller 12 within camera images (e.g., relative to the handheld portion of the controller 12, see FIG. 1B). For example, the internal light sources (e.g., LEDs) just described within each of the spherical structures 12a, 12b, 12c may differ from each other in color and/or generate distinctive (e.g., modulated or pulse on/off) lighting patterns.

In additional examples, during situations when it is possible that more than one controller may be within the visual field of a camera, one or more distinctive reflective patterns and/or the timing of modulating controller light sources may be used to distinguish one controller from another. During normal operation by a user, modulation of controller lighting may be an aspect of user feedback (e.g., a flashing "reward" indication for selecting a correct answer). Knowledge by the one or more processors of the status of distinctive lighting during normal use or brief periods when identifying lighting patterns are produced by a controller (e.g., encoding a controller serial number) may be used to periodically identify individual controllers within a visual field.

During operation, controllers may (optionally) include additional modes of user feedback including haptic and audio signalling. Based on such signals, a user may be instructed to perform an identifiable action during the time the controller is producing such user feedback. For example, upon sensing haptic vibration or sound from the controller, the user may wave a controller in the air. The sensing of such controller motion may subsequently be used to verify the identity of a specific controller (i.e., the one producing user feedback) and/or associated device user.

FIG. 1A also shows a pair of pushbuttons 13a, 13b incorporated within the handheld controller 12. These additional optional controller elements 13a, 13b may be depressed by one or more digits of the hand used to manipulate controller 12. Depressing individual switches or combinations of switches 13a, 13b may, for example, immediately alter the attributes of virtual objects and/or selection characteristics (e.g., alternative menus) of choices enacted using the touch-screen 11 and/or handheld controller 12.

Figure 1B:
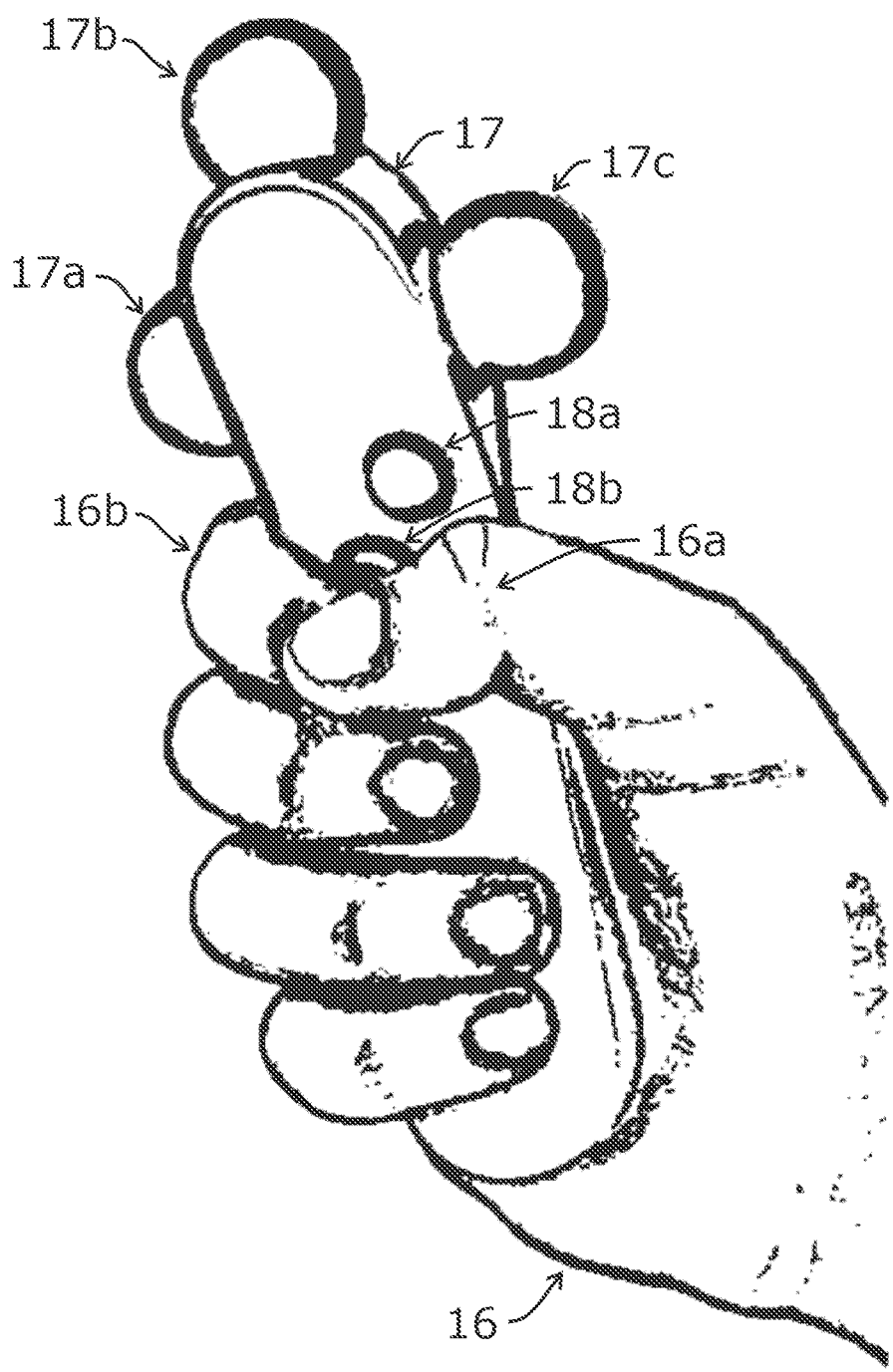
FIG. 1B shows a handheld controller used to enact bimanual control including three spherical components (i.e., balls) to facilitate camera-based tracking of the controller and two pushbutton controls (where the thumb in FIG. 1B is moved slightly compared with normal controller use to reveal the switches).

FIG. 1B conveys a more detailed view of the handheld controller 17 illustrated in FIG. 1A along with a view of a child's hand 16 gripping the controller 17. In this image, the thumb 16a of the hand 16 has been moved slightly compared to its position during normal use in order to reveal two switches 18a, 18b that may optionally (i.e., in addition to tracking of the movements of the overall controller) be used as additional handheld controls. As shown in FIG. 1B, both switches 18a, 18b may be operated by a thumb 16a or, alternatively, one switch 18a may be operated by a thumb 16a while the other switch 18b may be operated by an index finger 16b.

FIG. 1B also shows three trackable spherical components (i.e., attached balls) 17a, 17b, 17c that help enact camera-based tracking of the controller 17. As just described, these balls 17a, 17b, 17c may be translucent or transparent, and/or illuminated from within using different colored LEDs. The size and separations of the spherical structures may be known to the one or more processors, further helping calculations to determine locations and orientations (including estimates of distance from the one or more cameras) of the handheld controller 17 based on camera images.

Figure 2:
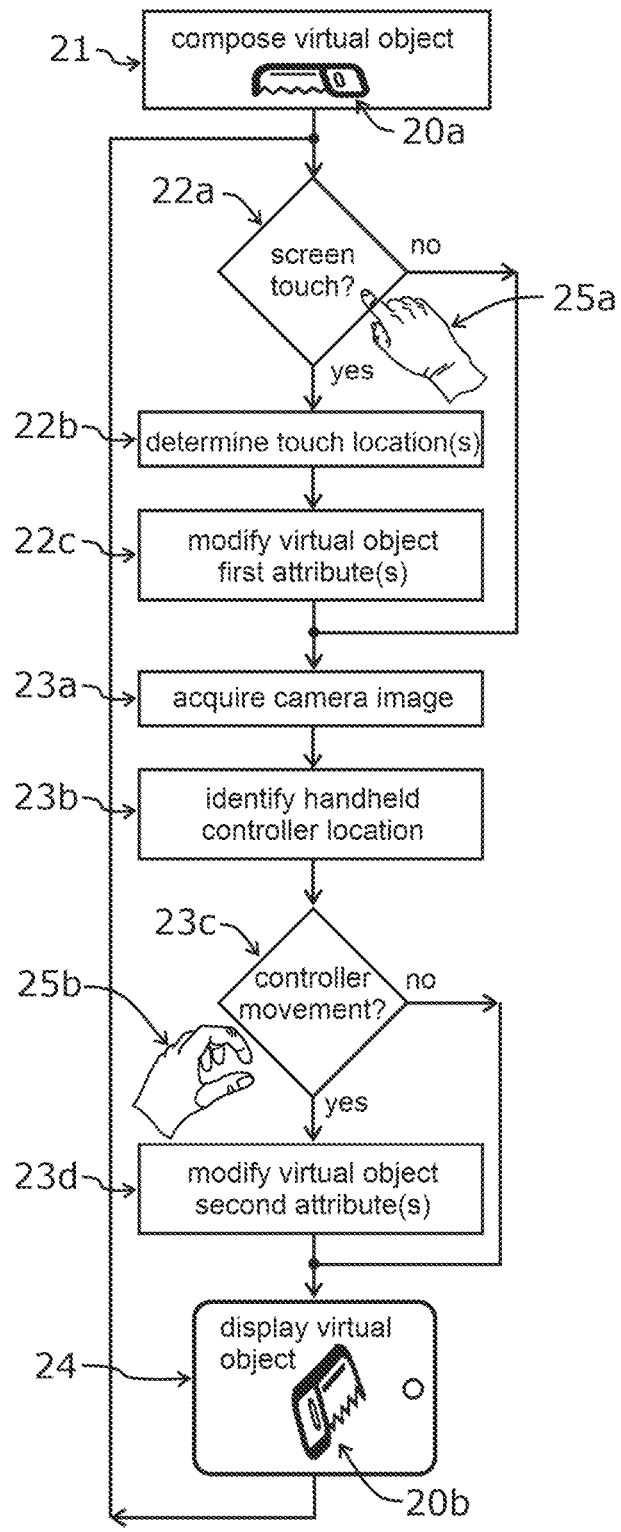
FIG. 2 is a flowchart outlining exemplary steps to acquire bimanual interactions with a virtual object (i.e., a saw) via a touch-sensitive display operated by a digit of a right hand and camera-based tracking of a handheld controller manipulated by a left hand.

FIG. 2 is a flowchart that outlines exemplary steps to acquire and implement bimanual interactions with a virtual object via a touch-sensitive display operated by one or more digits of one hand 25a and camera-based tracking of a handheld controller manipulated by the other hand 25b. In this exemplary case, the virtual object is a handsaw 20a, 20b. The interactive session begins at 21 by composing, using one or more processors (not shown), a representation of the virtual object (i.e., the saw) 20a. If one or more digits of, in this example, a right hand 25a are sensed as touching the screen at 22a, then the one or more touch locations are determined at 22b and used as controls to modify one or more virtual object attributes at 22c. These attributes might include, for example, the handsaw's screen location and/or rotational orientation.

Next, a camera image is acquired at 23a by the one or more processors. If trackable components of the handheld controller (operated by the left hand in this example, 25b) are identified with the image at 23b, the newly acquired controller location is compared with any previous location(s) to determine if significant movement has occurred at 23c. If so, then one or more second sets of attributes of the virtual object may be modified at 23d. These attributes might include, for example, a directional perspective to view the virtual handsaw and/or distance from the virtual object of that viewing perspective. Using both the first and second sets of virtual object attributes, an updated representation of the virtual object may be computed and displayed, for example, on a tablet device at 24. In this example, the handsaw is re-drawn with a three-dimensional point-of-view as if it were being viewed during typical use by a left-handed person 20b.

Figure 3:
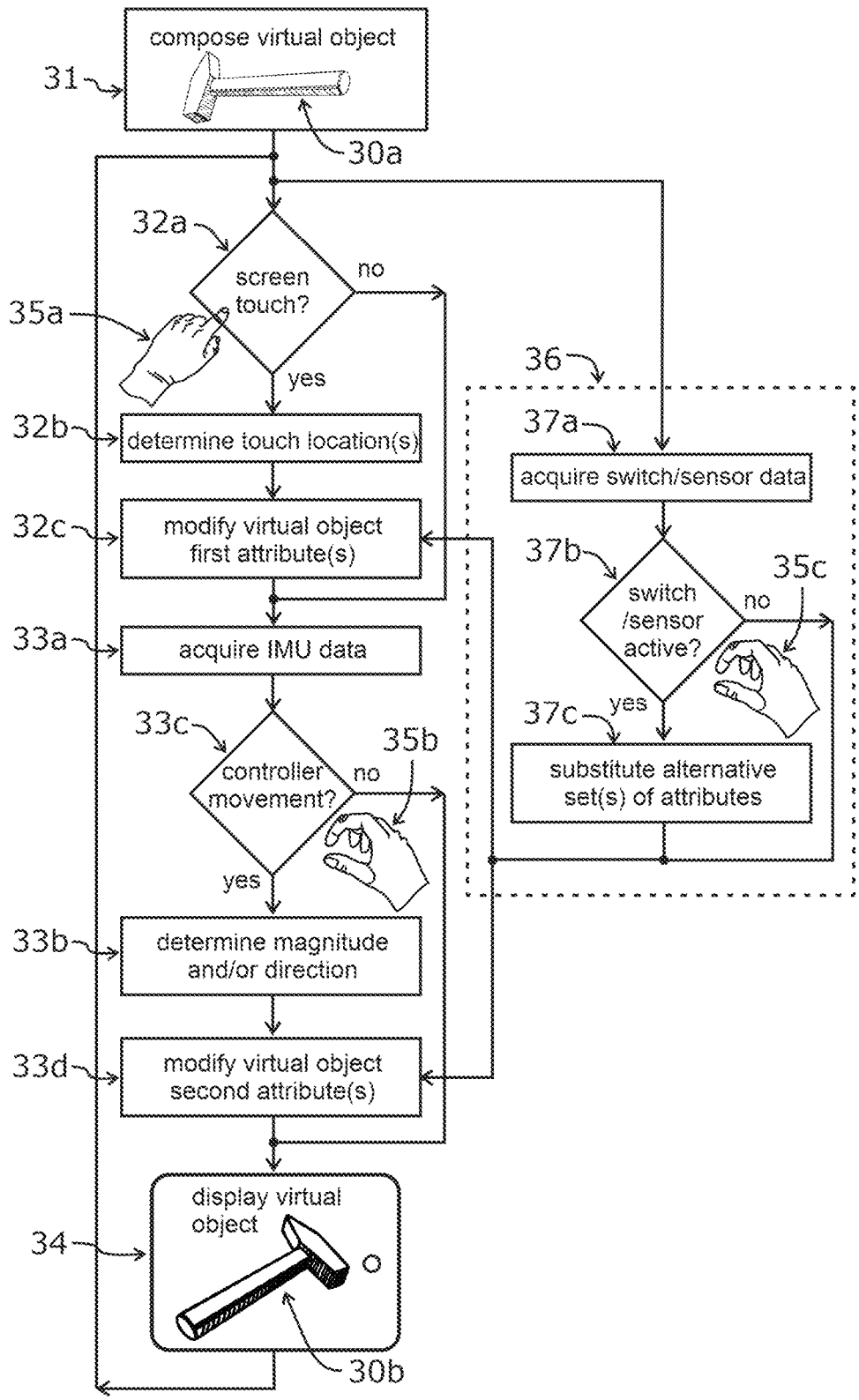
FIG. 3 is a flowchart outlining exemplary steps to acquire bimanual interactions with a virtual object (i.e., a hammer) via a touch-sensitive display operated by a left hand and IMU-based tracking of a handheld controller (and optional pushbutton selections) manipulated by a right hand.

Structured similarly to FIG. 2, FIG. 3 is a flowchart that outlines exemplary steps to acquire and implement bimanual interactions with virtual objects via a touch-sensitive display operated by one or more digits of one hand 35a and IMU-based tracking of a handheld controller manipulated by the opposing hand 35b. The interactive session begins at 31 by composing an initial representation of a virtual hammer 30a. If one or more digits of, in this example, a left hand 35a are sensed as touching the display at 32a, then the one or more touch locations are determined at 32b for use as one or more controls to modify one or more of the virtual object's attributes at 32c. These attributes might include, for example, the virtual hammer's size, screen location and/or rotational orientation.

IMU data are then acquired at 33a by the one or more processors (not shown). If sufficient acceleration of the handheld controller (held by the right hand in this example, 35b) is measured in one or more directions (i.e., any of three dimensions) at 33c, then magnitudes and movement directions are determined at 33b and used to compute one or more second sets of attributes of the virtual object at 33d. In this exemplary case, these attributes might include thicknesses and/or smoothness of component lines used to draw the hammer. Using both the first and second sets of virtual object attributes, the virtual object may be displayed, for example, on a tablet device at 34. In FIG. 3, the hammer has been drawn with thicker component lines (compared with the initially composed object 30a) and rotated such that the head of the hammer 30b points toward the upper right of the display (e.g., toward a virtual nail, not shown).

FIG. 3 also illustrates an optional inclusion (indicated by a dashed-line rectangle 36 surrounding optional steps) of substantially simultaneously sensing statuses of one or more pushbutton switches and/or other handheld controller sensors using digits of the opposing hand 35c. The statuses of the one or more switches/sensors may be acquired at 37a by one or more processors (not shown). If the status of one or more switches/sensors has changed (compared with previous acquisitions), then one or more alternate menus of attributes may be substituted at 37c during the processes of modifying first and/or second sets of virtual object attributes as a result of one or more screen touches at 32c and/or controller movements at 33d resulting from camera-based tracking (not shown in FIG. 3, see FIG. 2) or IMU-based detection of movements of the handheld controller.

Figure 4:
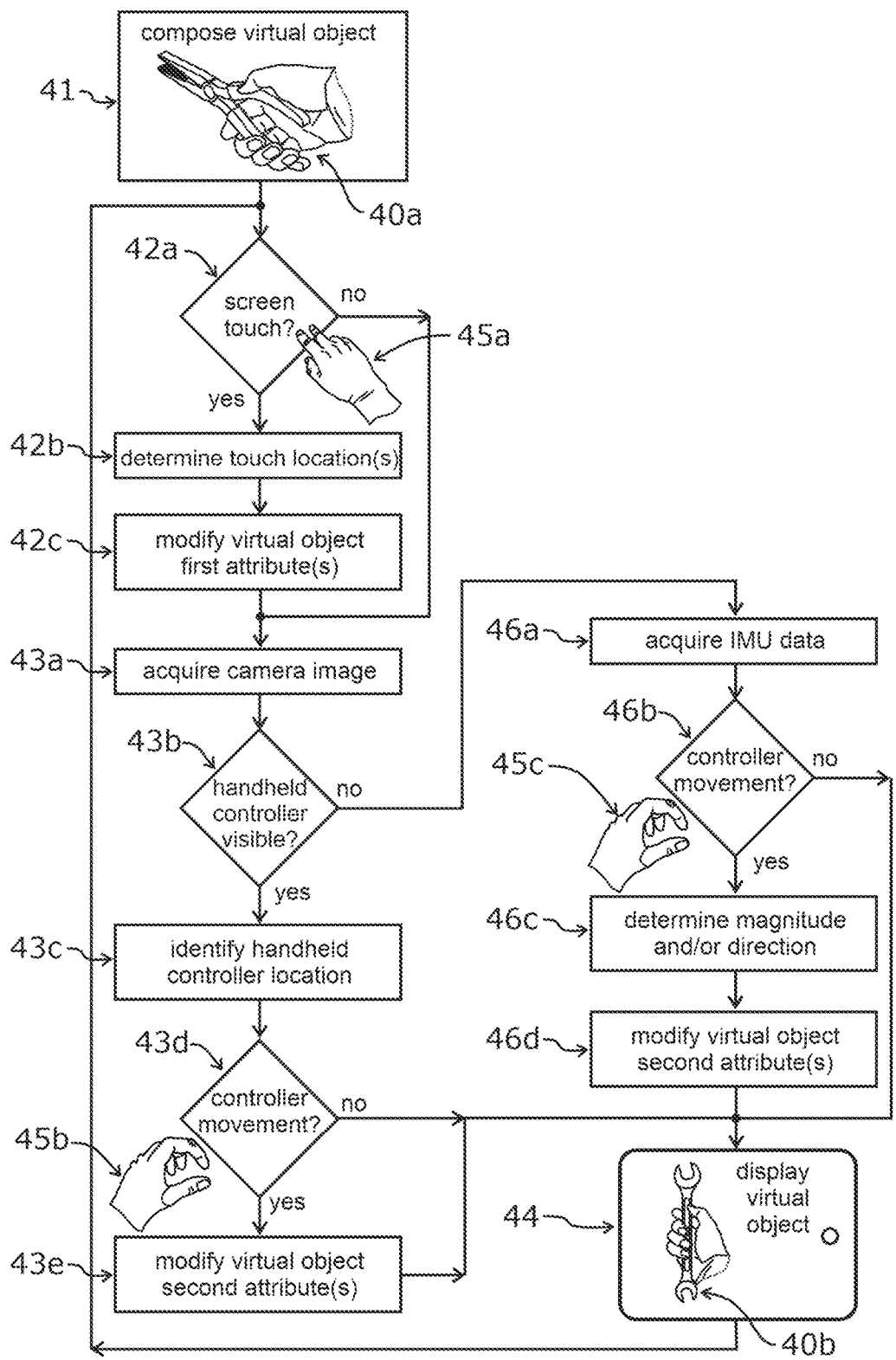
FIG. 4 is a flowchart outlining exemplary steps to acquire bimanual interactions including selections of virtual tools (e.g., initially starting with a pair of pliers but eventually selecting a wrench) via a touch-sensitive display using two digits of a right hand and a handheld controller simultaneously manipulated by a left hand, where camera-based tracking is backed up by IMU measurements when the controller is not visible to the camera.

FIG. 4 is a flowchart that outlines exemplary steps to acquire bimanual interactions using camera-based tracking of a handheld controller backed up by IMU-based tracking if and/or when camera-trackable controller components are not adequately visible or discernable to the one or more cameras. Camera-based tracking generally provides improved positional accuracy and may additionally provide measurements of controller position relative to other objects within the environment of a user. However, when the handheld controller is not observable by a camera, IMU-based measurements may take over to supply positional and/or directional data. IMU-based measurements may possess less positional accuracy, but are generally available at all times.

In FIG. 4, an initial virtual object is composed at 41 (by one or more processors, not shown), comprising a right hand holding a pair of pliers 40a. Bimanual control is implemented by first determining the presence of screen touches at 42a. In this exemplary case, the screen is being touched by two fingers of a right hand 45a of the user. The two digits may, for example, specify a display location, size and rotational orientation of one or more virtual objects. More generally, if one or more digits (or other screen contact mechanisms enacted by the user, such as using a stylus) are determined to be in contact with the touch-sensitive display, the one or more locations are determined at 42b by the one or more processors (not shown) and used to modify a first set of attributes of the virtual object(s) at 42c.

Next, a camera image is acquired at 43a by the one or more processors and a determination is made whether one or more camera-trackable components of the handheld controller are visible at 43b. If not, the system reverts to acquiring IMU measurements at 46a. If the one or more camera-trackable components of the handheld controller are visually trackable, controller location is identified at 43c. Similar to FIG. 2, if movement (i.e., comparing measurements from previous camera images) has occurred at 43d, a second set of the one or more attributes of the one or more virtual objects are modified at 43e.

If the handheld controller is not visually trackable, at 46a, acquired IMU data may be analysed (by the one or more processors, not shown) to determine if there has been substantial movement at 46b. If so, then a determination is made of the magnitude and/or direction of controller motion at 46c which, in turn, may be used to modify the second set of the one or more attributes of the one or more virtual objects at 46d. Regardless of whether display attributes have been determined based on camera-based or IMU tracking, a resultant virtual object may be displayed on the display device (e.g., tablet, mobile device) at 44 and the overall bimanual tracking process repeated.

In the interaction shown in FIG. 4, whether tracked by a camera or IMU, a left hand 45b, 45c is being employed to specify a second set of virtual object attributes. During this exemplary interaction (e.g., at selected times and/or using one or more controller push buttons), the selection of an overall virtual object (e.g., from a menu of virtual tools) may be one "attribute" specified using the handheld controller. For example, vertical, horizontal and/or rotational movements of the handheld controller may be used individually or collectively to choose from one or more sets of choices of mechanical tool selections (e.g., from a scroll, rotational menu, grid menu, pop-down selection). In FIG. 4, an initial virtual object assignment of a pair of pliers 40a was modified to that of a wrench 40b at 44. As described above, at 42a, the position and orientation of the wrench may be specified bimanually, using two-finger hand control 45a via the touch screen to locate and orient the wrench vertically (e.g., to turn a virtual bolt).

As described in greater detail above, the overall sequence of operations illustrated in FIGS. 2, 3 and 4 includes determining screen touches followed by tracking of the handheld controller manipulated by the opposing hand (and optionally, any buttons pushed). This sequential order is for illustrative purposes only and is not a necessary sequence or component of system functions. Data acquisition from the different input devices and subsequent processing may be performed in parallel, or in any sequential order. Such processing in a repeated serial fashion (i.e., continuous loop, as illustrated) may occur so quickly that the timing of individual processing steps is not noticeable to any user.

FIG. 5 shows a scene from a touch-sensitive display demonstrating the hammering of virtual nails 54a, 54b, 54c, 54*d*, 54*e* into a virtual wooden board 53 in which a finger 51 of one hand 50*a* is used to position on a touch-sensitive display each nail to be hammered while the other hand 50*b* performs the act of hammering individual nails 54*a* via movements of a handheld controller 57. At the time shown in the scene in FIG. 5, one nail 54*d* is completely hammered into the board 53, two nails 54*b*, 54*e* have been partially nailed into the board 53, hammering has been completed to partially drive in a fourth nail 54*a*, and a fifth nail 54*c* has just been created (i.e., becoming a new target nail) via a screen-touch by the index finger 51 of the left hand 50*a* of the user at the location on the virtual board 53 specified by the finger touch 52. In this scenario, new screen touches (i.e. using the left hand) at empty board locations result in the formation of new virtual nails (e.g., 54*c*). Screen touches at locations already occupied by nails allow previously created nails (e.g., 54*a*, 54*b*, 54*d*, 54*e*) to be further hammered.

Camera-based tracking of the handheld controller 57 may be facilitated by three spherical structures 57*a*, 57*b*, 57*c* that are distinct from background (e.g., using internal illumination, distinct coloring, unique reflective patterns). Tracked up-and-down motions 56*b* performed by the right hand 50*b* of the user are mirrored by up-and-down motions 56*a* of the virtual hammer 55 (i.e., ignoring most linear or rotational motions in other directions by the controller 57 in this exemplary case). In other words, interpretive control is being used to cause the hammer to directly hit each target nail (i.e., lateral movements of the controller do not cause a nail to be missed). Such up-and-down hammering motions cause each target nail to be incrementally driven into the board where distance travelled during each increment may be dependent on maximum downward velocity of the motions 56*b* during each stroke by the controller 57. The head of each virtual nail cannot be driven through the virtual board 53 (e.g., see 54*d*).

Furthering the realism of the virtual hammering activity, each nail strike may be heard via sounds generated by one or more speakers (not shown) where the volume (and tone) of each nail-strike sound is also dependent on maximum downward velocity of the motions 56*b*. Additionally, the hammer 55 and/or board 53 may be seen to vibrate briefly following each virtual strike, and results of nails being driven all the way through virtual boards 53 may be seen as nails exiting 58*a*, 58*b* the other side of the board 53. In other words, virtual activities may take into account the structural, optical and acoustic properties of the materials being manipulated virtually as well as laws of physics.

FIG. 6 shows a scene involving the use of virtual screws 64*a*, 64*b*, 64*c*, 64*d* to help fasten a virtual wooden board 63 in which one hand 60 controls the locations of virtual screws while, substantially simultaneously, the other hand (not shown) controls the rotational operation 66 of a virtual screwdriver 65. At the time shown in the scene in FIG. 6, two (Phillips head style) virtual screws 64*a*, 64*d* have been completely screwed into the virtual board 63, the process of partially screwing in a screw 64*c* at a previously specified board location 67 (e.g., using a finger of the left hand 60) using a virtual screwdriver 65 has been completed, and a target location 62 on the display for a newly created virtual screw 64*b* is being specified by the index finger 61 of the user's left hand 60. Similar to the scenario in FIG. 5, new screen touches (i.e. using the left hand) at empty board locations result in the formation of new virtual screws (e.g., 64*b*) whereas screen touches at locations already occupied by screws allow previously created screws (e.g., 64*c*) to be further screwed in.

Tracked rotational motions (e.g., particularly using one or more embedded IMUs) performed by right-handed manipulation of a handheld controller (not shown) are mirrored by rotational movements 66 of the virtual screwdriver 65. In this case, linear movements of the handheld controller may be largely ignored and only rotational motions may be sensed and mirrored 66 by the virtual screwdriver 65. In other words, interpretive control is being used to control virtual screwdriver actions, directing the business-end of the virtual screwdriver to the functional tip of a target screw. Clockwise rotational motions result in the target screw (e.g., 64*b*) being incrementally driven into the virtual board 63. Distance driven by a virtual screw during each turning motion may be computed based on rotational distance covered by the handheld controller (i.e., in the clockwise direction) and the pitch of the virtual screw.

Turning motions may be accompanied by a "scratching" sound often associated with the turning of screws (where sound duration may be controlled by the time taken to turn clockwise, and volume and pitch may be correlated with rotational velocity). Counter clockwise movements of the handheld controller may be accompanied by a "ratcheting" sound, emulating the operation of a ratcheting screwdriver that may be set to slip (i.e., not apply force) in one rotational direction (i.e., counter clockwise, in this exemplary case). The functional direction of the ratcheting screwdriver 65 may be reversed, for example, using a pushbutton on the handheld controller (see FIG. 1B) to reverse the rotational direction in which force is applied, allowing screws to be extracted and/or discarded.

The head of each virtual screw cannot be driven through the virtual board 63 (e.g., see screws 64*a*, 64*d*). Any screws that are sufficiently long to traverse the thickness of a board 63 may be seen protruding from the other side of the board (e.g., 68). In other words, virtual activities may take into account many of the structural, optical and acoustic properties of the materials being handled, in addition to obeying laws of physics during virtual activities.

FIG. 7 demonstrates a scenario involving the sawing of a virtual board in which multiple digits 71*a*, 71*b* of one hand 70*a* on a touch-sensitive display control the location and angle of a cut 72 while substantially simultaneously sensed motions of the other hand 70*b* manipulating a handheld controller 77 are used to push a virtual saw 75 back-and-forth 76 to cut the board into two pieces 73*a*, 73*b*. In this exemplary case, the index 71*a* and middle 71*b* fingers of the left hand 70*a* are used to control the location and cutting angle (e.g., relative to the long axis of the board) of the cut 72. The acknowledging or registering by one or more processors (not shown) of the location and angle of the cut 72, may be signalled by an indication (e.g., visual and/or audio cue) or directive (e.g., "Cut!" 74 flashed on the saw blade 75*a*).

Once registered, back-and-forth movements of the handheld controller 77 manipulated by a user's right hand 70*b* translate to back-and-forth movements 76 of the blade 75*a*, handle 75*b* and cutting edge 75*c* portions of the virtual saw 75. As described above, camera-based tracking of the handheld controller 77 may be facilitated by spherical structures 77*a*, 77*b*, 77*c* or other distinctive controller elements. Sawing actions may be accompanied by "grinding" sounds normally associated with hand sawing. In this exemplary case, radial (i.e., relative to a user's body) motions of the controller, both toward and away from the user may result in cutting motions 76 by the virtual saw 75*a* along with penetration into the virtual wood. Using the concept of interpretive control, controller motions in other directions (e.g., including up-and-down or rotational movements) may be largely ignored with respect to controlling the virtual saw 75 (although they may be used to enact other aspects of construction activities).

During the process of cutting the virtual board into two pieces 73*a*, 73*b*, sawdust 78 may be generated and fall down from the cutting process, with motions dictated by initial particle velocities (e.g., influenced by the direction of the saw), air friction, and the gravitational pull of the earth. Once cut, each resultant board piece 73*a*, 73*b* may have a size and shape stemming from the cut 72, and fall separately toward the ground (with motions dominated by the gravitational pull of the earth). Obeying such laws of physics as well as structural, optical and acoustic properties may add to the realism, acceptance, and/or enjoyment of virtual activities.

Taken together, the virtual activities demonstrated in FIGS. 5, 6 and 7 may facilitate the construction of complex virtual objects, such as a child's play structure or pet house. Learning such activities in a virtual world, especially by a young child guided by a parent, guardian or grandparent may not only be an enjoyable educational experience, but prepare and lead to the successful planning and construction of such structures in the real world.

The foregoing disclosure of the examples has been presented for purposes of illustration and description. It is not intended to be exhaustive or to limit the invention to the precise forms disclosed. Many variations and modifications of the examples described herein will be apparent to one of ordinary skill in the art in light of the above disclosure. It will be appreciated that the various components and features described with the particular examples may be added, deleted, and/or substituted with the other examples, depending upon the intended use of the examples.

Further, in describing representative examples, the specification may have presented the method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims.

While the invention is susceptible to various modifications, and alternative forms, specific examples thereof have been shown in the drawings and are herein described in detail. It should be understood that the invention is not to be limited to the particular forms or methods disclosed, but to the contrary, the invention is to cover all modifications, equivalents and alternatives falling within the scope of the appended claims.

We claim:

1. A method for a human to bimanually interact with one or more virtual objects, comprising:
    providing a touch-sensitive display, a camera and a handheld controller all in proximity to the human, all of the touch-sensitive display, the camera, and the handheld controller operatively coupled to one or more processors;
    wherein the handheld controller is operated by a first hand of the human and includes one or more camera-trackable components;
    acquiring, by the camera, a first image of the one or more camera-trackable components;
    determining within the first image, by the one or more processors, a first controller location of the one or more camera-trackable components;
    assigning, by the one or more processors, one or more first display attributes of the one or more virtual objects based on the first controller location;
    determining, by the one or more processors, one or more first digit locations on the touch-sensitive display contacted by one or more digits of a second hand of the human;
    assigning, by the one or more processors, one or more second display attributes of the one or more virtual objects based on the one or more first digit locations; and
    displaying, by the one or more processors on the touch-sensitive display, using the one or more first display attributes and the one or more second display attributes, the one or more virtual objects.

2. The method of claim 1, wherein the touch-sensitive display and the camera are incorporated within a single electronic device.

3. The method of claim 1, wherein the one or more camera-trackable components comprise one or more of one or more light emitting diodes, one or more light-reflective surfaces, one or more colored surfaces, one or more translucent materials, one or more light-diffusing materials, a predetermined component shape, a predetermined light-reflective pattern, a predetermined colored pattern, a predetermined translucent material pattern, and a predetermined light-diffusing pattern.

4. The method of claim 1, wherein the one or more first display attributes and the one or more second display attributes each comprises one or more of object menu selection, object size, object shape, object display location, one or more object colors, one or more textures, one or more object component line thicknesses, one or more object component line characteristics, object transparency, object orientation relative to one or more edges of the touch-sensitive display, object stretch in one or more directions, three-dimensional object viewing perspective, object text labelling, one or more sounds associated with the object, object rotation, object translation, and one or more characteristics of object movement.

5. The method of claim 4, wherein one of the one or more first display attributes and the one or more second display attributes each comprises object display location and wherein the object display location is determined by one of:
    aligning the first controller location with one of a center of the virtual object, a predetermined edge of the virtual object, a predetermined reference location of the virtual object, the predetermined reference location of the virtual object offset by a predetermined distance and a predetermined direction, and a rotational center of the virtual object;
    identifying a nearby displayed object located closest to the first controller location, identifying a predetermined nearby reference location of the nearby displayed object, and displaying the virtual object at the predetermined nearby reference location;
    aligning the one or more first digit locations with one of a center of the virtual object, a predetermined edge of the virtual object, a predetermined reference location of the virtual object, the predetermined reference location of the virtual object offset by a predetermined distance and a predetermined direction, and a rotational center of the virtual object; and identifying a nearby displayed object located closest to the one or more first digit locations, identifying a predetermined nearby reference location of the nearby displayed object, and displaying the virtual object at the predetermined nearby reference location.

6. The method of claim 1, wherein one or more additional first display attributes of the one or more virtual objects are assigned, by the one or more processors, based on one or more additional controller locations by:
   acquiring, by the camera, additional images of the one or more camera-trackable components; and
   determining within the additional images, by the one or more processors, the one or more additional controller locations of the one or more camera-trackable components.

7. The method of claim 1, wherein one or more additional second display attributes of the virtual object are assigned, by the one or more processors, based on one or more additional digit locations on the touch-sensitive display contacted by the one or more digits of the second hand of the human.

8. The method of claim 1, wherein the handheld controller additionally includes one or more switches operated by the first hand of the human.

9. The method of claim 8, wherein one or more third display attributes of the one or more virtual objects are assigned, by the one or more processors, based on one or more states of the one or more switches; and
   the one or more processors display the one or more virtual objects on the touch-sensitive display using the one or more first display attributes, the one or more second display attributes, and the one or more third display attributes.

10. A method for a human to bimanually interact with one or more virtual objects, comprising:
    providing a touch-sensitive display and a handheld controller both in proximity to the human, both the touch-sensitive display and the handheld controller operatively coupled to one or more processors;
    wherein the handheld controller is operated by a first hand of the human and includes one or more inertial measurement units;
    acquiring, by the one or more processors from the one or more inertial measurement units, first acceleration data;
    determining from the first acceleration data, by the one or more processors, one or both of a first acceleration magnitude and a first acceleration direction;
    assigning, by the one or more processors, one or more first display attributes of the one or more virtual objects based on at least one of the first acceleration magnitude and the first acceleration direction;
    determining, by the one or more processors, one or more first digit locations on the touch-sensitive display contacted by one or more digits of a second hand of the human;
    assigning, by the one or more processors, one or more second display attributes of the one or more virtual objects based on the one or more first digit locations; and
    displaying, by the one or more processors on the touch-sensitive display, using the one or more first display attributes and the one or more second display attributes, the one or more virtual objects.

11. The method of claim 10, wherein the one or more first display attributes and the one or more second display attributes each comprises one or more of object menu selection, object size, object shape, object display location, one or more object colors, one or more textures, one or more object component line thicknesses, one or more object component line characteristics, object transparency, object orientation relative to one or more edges of the touch-sensitive display, object stretch in one or more directions, three-dimensional object viewing perspective, object text labelling, one or more sounds associated with the object, object rotation, object translation, and one or more characteristics of object movement.

12. The method of claim 10, wherein one or more additional first display attributes of the one or more virtual objects are assigned, by the one or more processors, based on one or both of an additional acceleration magnitude and an additional acceleration direction by:
    acquiring, by the one or more processors from the one or more inertial measurement units, additional acceleration data; and
    determining from the additional acceleration data, by the one or more processors, one or both of the additional acceleration magnitude and the additional acceleration direction.

13. The method of claim 10, wherein one or more additional second display attributes of the virtual object are assigned, by the one or more processors, based on one or more additional digit locations on the touch-sensitive display contacted by the one or more digits of the second hand of the human.

14. The method of claim 10, wherein the handheld controller additionally includes one or more switches operated by the first hand of the human.

15. The method of claim 14, wherein one or more third display attributes of the one or more virtual objects are assigned, by the one or more processors, based on one or more states of the one or more switches; and
    the one or more processors display the one or more virtual objects on the touch-sensitive display using the one or more first display attributes, the one or more second display attributes, and the one or more third display attributes.

16. A system for a human to bimanually interact with one or more virtual objects, comprising:
    a touch-sensitive display, a camera, and a handheld controller;
    one or more processors operatively coupled to all of the touch-sensitive display, the camera, and the handheld controller;
    wherein the handheld controller is configured to be operated by a first hand of the human and includes one or more camera-trackable components; and
    wherein the one or more processors are configured to:
    acquire by the camera a first image of the one or more camera-trackable components;
    determine within the first image, a first controller location of the one or more camera-trackable components;
    assign one or more first display attributes of the one or more virtual objects based on the first controller location;
    determine one or more first digit locations on the touch-sensitive display contacted by one or more digits of a second hand of the human;
    assign one or more second display attributes of the one or more virtual objects based on the one or more first digit locations; and
    display on the touch-sensitive display, using the one or more first display attributes and the one or more second display attributes, the one or more virtual objects.

17. The system of claim 16, wherein the touch-sensitive display and the camera are incorporated within a single electronic device.

18. The system of claim 16, wherein the one or more camera-trackable components comprise one or more of one or more light emitting diodes, one or more light-reflective surfaces, one or more colored surfaces, one or more translucent materials, one or more light-diffusing materials, a predetermined component shape, a predetermined light-reflective pattern, a predetermined colored pattern, a predetermined translucent material pattern, and a predetermined light-diffusing pattern.

19. The system of claim 16, wherein the handheld controller additionally includes one or more switches operated by the first hand of the human.

20. The system of claim 19, wherein the one or more processors are further configured to:
assign one or more third display attributes of the one or more virtual objects based on one or more states of the one or more switches; and
display on the touch-sensitive display, using the one or more first display attributes, the one or more second display attributes, and the one or more third display attributes, the one or more virtual objects.

21. The system of claim 16, wherein the one or more first display attributes and the one or more second display attributes assigned by the one or more processors each comprises one or more of object menu selection, object size, object shape, object display location, one or more object colors, one or more textures, one or more object component line thicknesses, one or more object component line characteristics, object transparency, object orientation relative to one or more edges of the touch-sensitive display, object stretch in one or more directions, three-dimensional object viewing perspective, object text labelling, one or more sounds associated with the object, object rotation, object translation, and one or more characteristics of object movement.

* * * * *